(12) United States Patent
Kleczewski et al.

(10) Patent No.: US 12,037,201 B2
(45) Date of Patent: Jul. 16, 2024

(54) MEASURING CONVEYOR BELT STRETCH

(71) Applicant: Laitram, L.L.C., Harahan, LA (US)

(72) Inventors: Lazlo Kleczewski, Oostzaan (NL); Martin A. Benavidez, Amsterdam (NL); Jonatan Milde Barales, Haarlem (NL)

(73) Assignee: Laitram, L.L.C., Harahan, LA (US)

( * ) Notice: Subject to any disclaimer, the term of this patent is extended or adjusted under 35 U.S.C. 154(b) by 51 days.

(21) Appl. No.: 17/968,858

(22) Filed: Oct. 19, 2022

(65) Prior Publication Data

US 2023/0174315 A1   Jun. 8, 2023

Related U.S. Application Data

(60) Provisional application No. 63/286,848, filed on Dec. 7, 2021.

(51) Int. Cl.
*B65G 43/02* (2006.01)
*G01D 5/248* (2006.01)

(52) U.S. Cl.
CPC .......... *B65G 43/02* (2013.01); *G01D 5/248* (2013.01)

(58) Field of Classification Search
CPC ......... G01D 5/248; B65G 43/02; B65G 43/06
USPC .................................................. 198/810.02
See application file for complete search history.

(56) References Cited

U.S. PATENT DOCUMENTS

| | | | |
|---|---|---|---|
| 4,372,172 A | 2/1983 | Gombocz et al. | |
| 4,409,852 A | 10/1983 | Suzuki et al. | |
| 5,291,131 A | 3/1994 | Suzuki et al. | |
| 5,957,263 A | 9/1999 | Espenschied | |
| 6,047,814 A * | 4/2000 | Alles | B65G 43/02 198/810.02 |
| 6,988,610 B2 | 1/2006 | Fromme et al. | |
| 7,347,317 B2 | 3/2008 | Aizawa et al. | |
| 7,540,374 B2 | 6/2009 | Rathbun et al. | |
| 9,139,376 B2 | 9/2015 | Andreoli et al. | |
| 10,794,686 B2 | 10/2020 | Murray et al. | |
| 11,174,106 B2 | 11/2021 | San Miguel Nunez | |
| 2004/0226805 A1* | 11/2004 | Lodge | B65G 43/02 198/810.02 |

FOREIGN PATENT DOCUMENTS

| | | | |
|---|---|---|---|
| DE | 102005037117 A1 | 5/2006 | |
| DE | 102010043057 A1 * | 5/2012 | B65G 43/02 |
| EP | 3475196 B1 * | 3/2023 | B65G 23/44 |
| GB | 2400090 A * | 10/2004 | B65G 43/02 |
| GB | 2377918 B | 2/2006 | |
| JP | 10332342 A | 12/1998 | |
| JP | 11334852 A | 12/1999 | |
| WO | 02079722 A1 | 10/2002 | |

* cited by examiner

*Primary Examiner* — James R Bidwell
(74) *Attorney, Agent, or Firm* — James T. Cronvich

(57) ABSTRACT

A system and method for measuring the elongation, or stretch, of a modular plastic conveyor belt. The belt-stretch measuring system measures stretch as the ratio less one of an actual belt travel distance or actual belt speed to an expected belt travel distance or expected belt speed for a new, unstretched belt. The actual belt travel distances or actual belt speeds are measured by sensors. The expected belt travel distances or expected belt speeds are calculated from the pulse outputs of encoders measuring the rotation of sprockets engaging the conveyor belt and from the known number of teeth on the sprockets. Actual belt pitch and catenary sag are also calculated.

20 Claims, 4 Drawing Sheets

MEASURING CONVEYOR BELT STRETCH

BACKGROUND

The invention relates generally to power-driven conveyors and more particularly to systems and methods for measuring the elongation, or stretch, of modular plastic conveyor belts.

Modular plastic conveyor belts constructed of rows of one or more thermoplastic belt modules joined end to end by hinge rods at hinge joints are used to convey products in many industries. When new, the belts have a nominal belt pitch, which is the distance between consecutive hinge joints. The nominal belt pitch is matched by the pitch of drive or idle sprockets that positively engage drive structure on the conveyor belt. The sprocket pitch is the distance between consecutive sprocket teeth. As the conveyor belt wears over time, it elongates, or stretches, and the belt pitch increases. The increase in pitch is due to cam-shafting of the hinge rods, wallowing out of the hinge eyes at the hinge joints, or plastic stretch in high-temperature applications. If the stretch is great enough, say about 3%, sprocket-to-belt engagement starts to degrade, and the belt intermittently disengages from some of the sprocket teeth and rides over them. And because belt speed is typically measured by shaft encoders, which do not account for belt stretch, tracking of conveyed articles for precise sorting, especially on long conveyors, is also degraded. So it's useful to be able to measure belt stretch to anticipate degraded belt performance and take remedial action.

SUMMARY

One version of a method for measuring conveyor-belt stretch comprises: (a) driving a conveyor belt having a nominal belt pitch in a direction of belt travel with rotating sprockets having a predetermined number of sprocket teeth; (b) determining an actual belt speed or an actual travel distance of the conveyor belt from the detection of a detectable on the conveyor belt; (c) determining a corresponding expected belt speed or a corresponding expected belt travel distance from an encoder signal from an encoder measuring the rotation of the sprockets and from the nominal belt pitch and the number of sprocket teeth; and (d) calculating a belt stretch from the expected belt speed and the actual belt speed or from the expected belt travel distance and the actual travel distance.

Another method for measuring conveyor-belt stretch comprises: (a) driving a conveyor belt having a nominal belt pitch in a direction of belt travel along a carryway with rotating first and second sprockets spaced apart a predetermined carryway length at opposite first and second ends of the carryway, wherein the first and second sprockets have a predetermined number of sprocket teeth; (b) coupling first and second encoders to the first and second sprockets to produce first and second encoder signals measuring the rotation of the first and second sprockets; (c) synchronizing the first and second encoder signals when the conveyor belt is operating at its nominal belt pitch; (d) determining the phase shift of the second encoder signal relative to the first encoder signal; and (e) calculating belt stretch from the phase shift, the nominal belt pitch, and the number of sprocket teeth.

One version of a conveyor-belt stretch measuring system comprises a conveyor belt having a nominal belt pitch advancing along a carryway in a direction of belt travel and engaged with rotating sprockets having a predetermined number of sprocket teeth. One or more sensors along the carryway detect the motion or position of a detectable on the conveyor belt and produce sensor signals indicative of the motion or position of the detectable. An encoder coupled to one of the sprockets produces encoder signals that measure the rotation of the sprockets. A processor executes programmed instruction to: (a) receive the sensor signals and the encoder signals; (b) calculate an actual belt speed or an actual travel distance of the conveyor belt from the sensor signals; (c) calculate a corresponding expected belt speed or a corresponding expected belt travel distance from the encoder signals and from the nominal belt pitch and the number of sprocket teeth; and (d) calculate a belt stretch of the conveyor belt from the expected belt speed and the actual belt speed or from the expected belt travel distance and the actual travel distance.

DETAILED DESCRIPTION

When a sprocket engaged with a new modular plastic conveyor belt with a predetermined nominal belt pitch makes one complete 360° rotation, the belt will have traveled a distance equal to the product of the number of sprocket teeth and the known nominal belt pitch. As the belt starts to wear, its pitch increases from the nominal belt pitch. Because of the belt's engagement with the sprocket teeth, one 360° rotation of the sprocket will move the same number of belt rows. But because the belt pitch has increased, the actual travel distance of the worn belt will be greater than for a new belt. So the actual speed of a worn belt cannot be determined accurately from sprocket rotation alone. To compensate for the increased belt pitch, the belt rides higher on the sprocket teeth at a slightly greater diameter.

Figure 1:
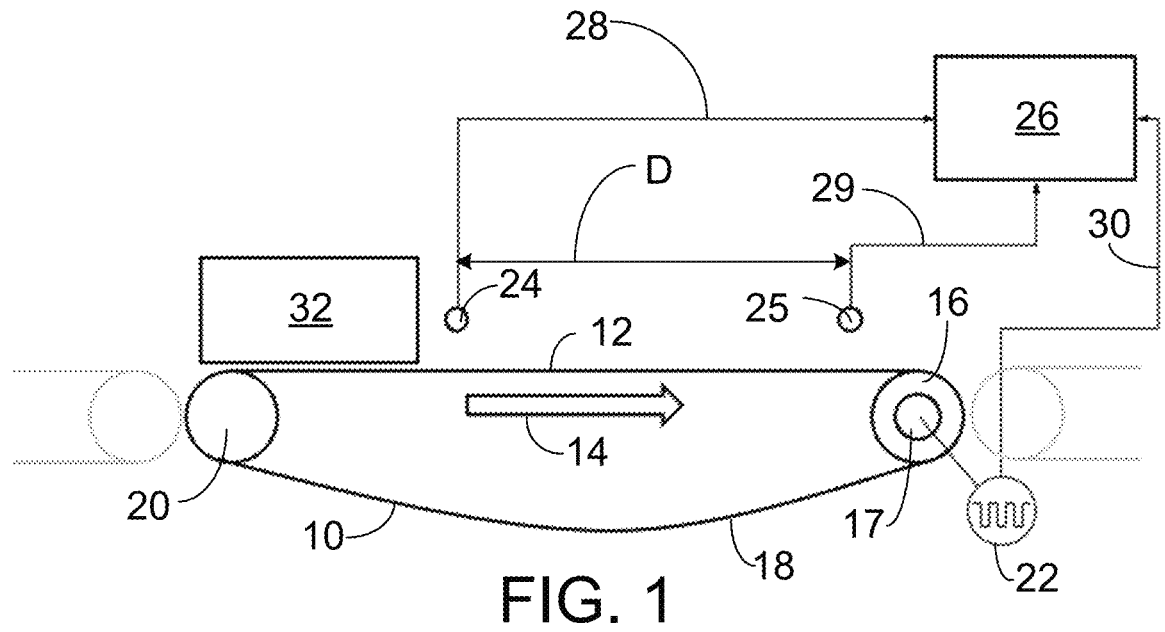
FIG. 1 is a schematic of a first version of a belt-stretch measuring system.

FIG. 1 shows a first version of a belt-stretch measuring system. A modular plastic conveyor belt 10 is driven along an upper carryway 12 in a direction of belt travel 14 by motor-driven sprockets 16 on a shaft 17 at a discharge end of the carryway. The conveyor belt 10 returns along a lower return 18 to idle sprockets 20 at an infeed end of the carryway 12. An encoder 22 is coupled to the sprockets 16 at the discharge end. Alternatively, the encoder could be coupled to the idle sprockets 20. The coupling can be achieved by mounting the encoder 22 on the shaft 17 or by being positioned to optically detect the shaft's or the sprocket's rotation. Two position sensors 24, 25 are positioned along the carryway 12 spaced apart a predetermined distance D. A processor 26 receives sensor signals 28, 29 from the position sensors 24, 25 and an encoder signal 30 from the encoder 22. The processor 26 can be a programmable controller or other conventional programmable device executing program instructions in program memory to receive the signals 28, 29, 30 and compute belt stretch, belt pitch, and catenary sag.

Figure 2:
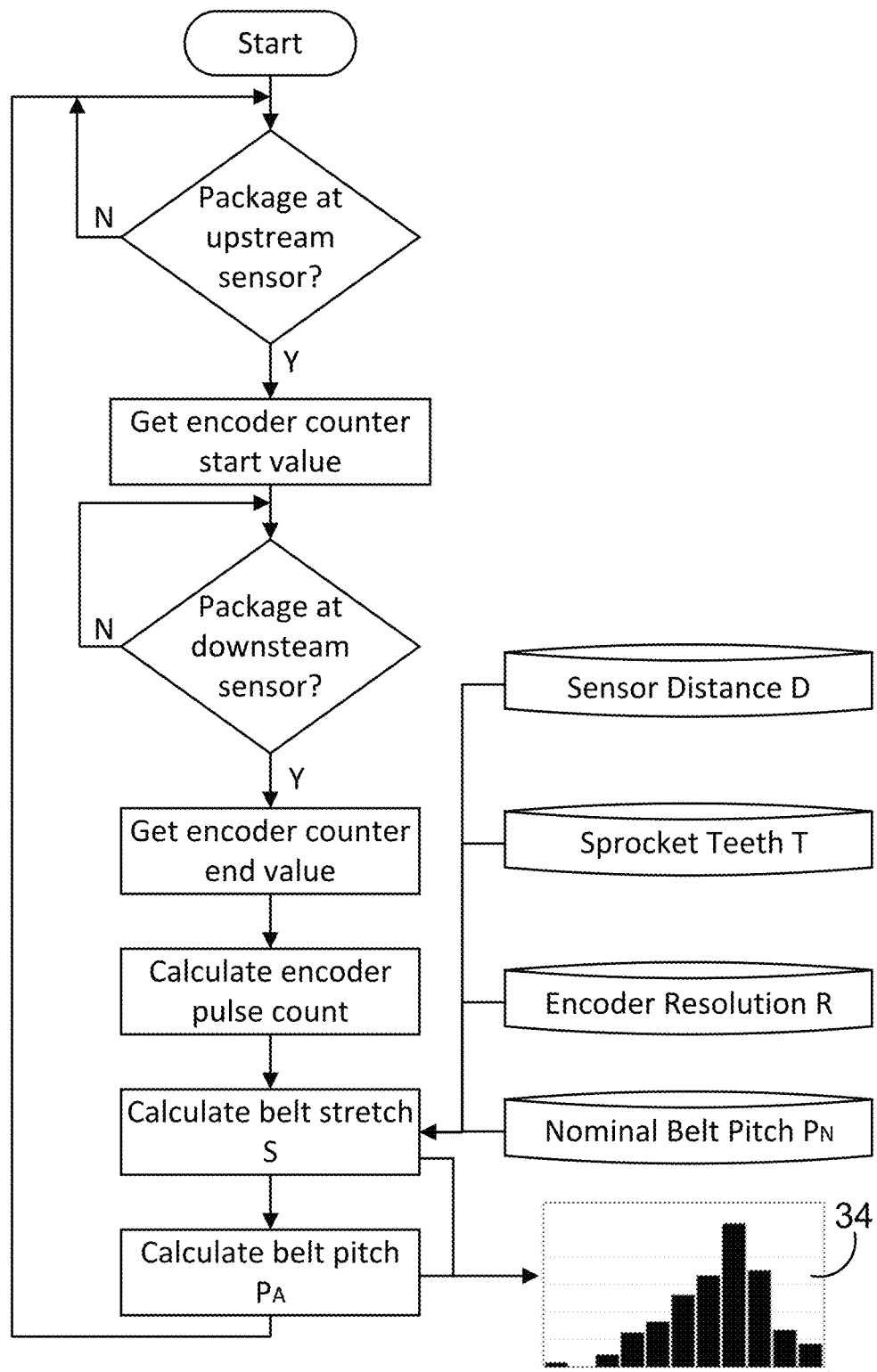
FIG. 2 is a flow chart of the operation of the belt-stretch measuring system of FIG. 1.

The flowchart in FIG. 2 is an example of the program steps the processor 26 executes to compute belt stretch and belt pitch in the system of FIG. 1. The processor 26 runs a counter that counts pulses in the encoder signal 30 received from the encoder 22 and read by the processor. At a first time, when the upstream position sensor 24 detects the leading edge of a conveyed object, such as a package 32, its sensor signal 28 indicates the detection to the processor 26, which reads the encoder count and stores that count in data memory as a pulse-count start value. At a later second time when the leading edge of the package 32 is detected by the downstream position sensor 25, the processor 26 reads the encoder count as a pulse-count end value. The processor 26 computes the difference between the end and start count values as the encoder pulse count, which is the number of encoder pulses counted as the package 32 advanced with the belt 10 the predetermined distance D. The processor 26 then computes the belt stretch $S=\{D/[(C/R)\cdot(P_N\cdot T)]\}-1$, where C is the encoder pulse count, R is the encoder resolution, $P_N$ is the nominal belt pitch, and T is the number of sprocket teeth. The numerator D in the expression in braces represents the actual travel distance. The denominator in that expression represents the expected travel distance; i.e., the distance an unstretched new belt would have traveled based on the number of revolutions (C/R) the sprocket made as the package 32 traveled the distance D. Thus, belt stretch S is defined as the ratio less one of the actual belt travel distance to the expected belt travel distance. So S=0 for a new belt and S>0 for a stretched belt. Multiplying S by 100% gives the belt stretch in percent. The processor 26 computes actual belt pitch $P_A=P_N\cdot(S+1)$. Alternatively, the processor 26 could compute belt pitch as $P_A=D/[(C/R)\cdot T]$. If the encoder 22 were precise enough and the package 32 completely stationary on the belt's surface, a single measurement of belt stretch and belt pitch would suffice. Otherwise, the processor 26 can filter or statistically analyze many computed values of belt stretch and belt pitch, as indicated by the histogram 34 of FIG. 2, for more robust estimates of stretch and pitch. With knowledge of the belt stretch and the geometrical arrangement of return rollers or shoes in the return 18, the processor 26 can also compute the catenary sag of the belt. Encoders, such as digital encoders, whose output signals are not pulses could be used instead to provide start and end readings from which the number of turns of sprocket rotation can be determined. Furthermore, the processor 26 can measure in the conventional way the rotational speed of the sprocket with the encoder 22 to get an expected belt speed with knowledge of the number of sprocket teeth. With knowledge of the belt stretch the processor 26 can compensate the expected belt speed for belt stretch by calculating a compensated belt speed that can be used to more accurately track packages advancing along the conveyor system.

Figure 3:
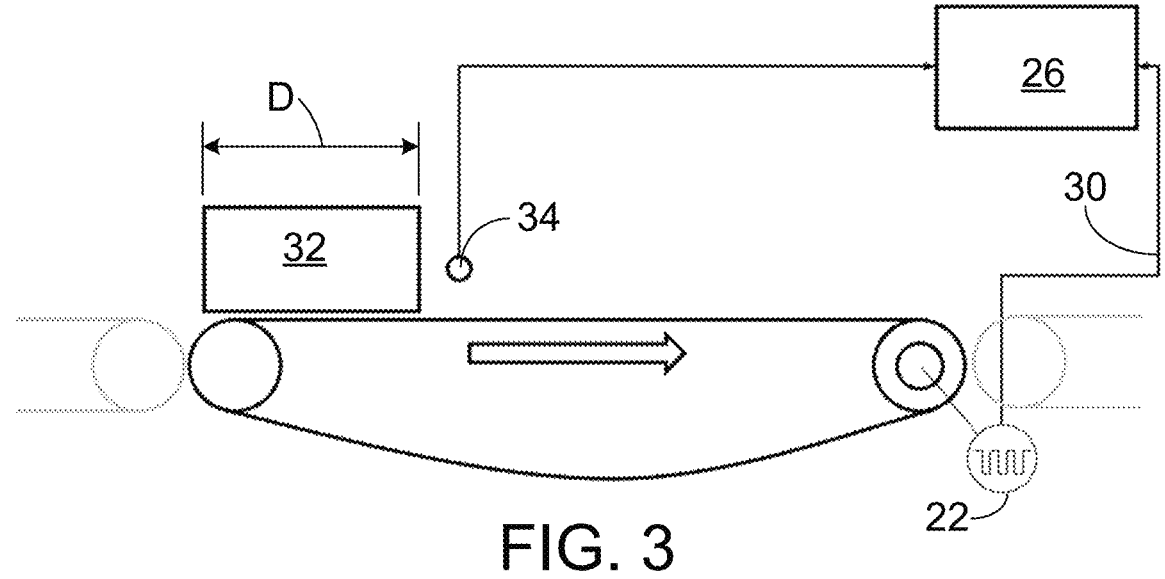
FIG. 3 is a schematic of a second version of a belt-stretch measuring system.

A second version of a belt-stretch measuring system is shown in FIG. 3. In this version a single position sensor 34 is used. The actual travel distance D used to compute belt stretch S is the predetermined length of the package 32, itself. The processor 26 gets the start and end counter values of the pulses in the encoder signal 30 from the encoder 22 when the position sensor 34 detects the leading and trailing ends of the package 32. The calculations of belt stretch, belt pitch, and catenary sag are identical to those for the system of FIG. 1. Additional sensors could be positioned along the carryway and used similarly to enhance the calculations.

Figure 4:
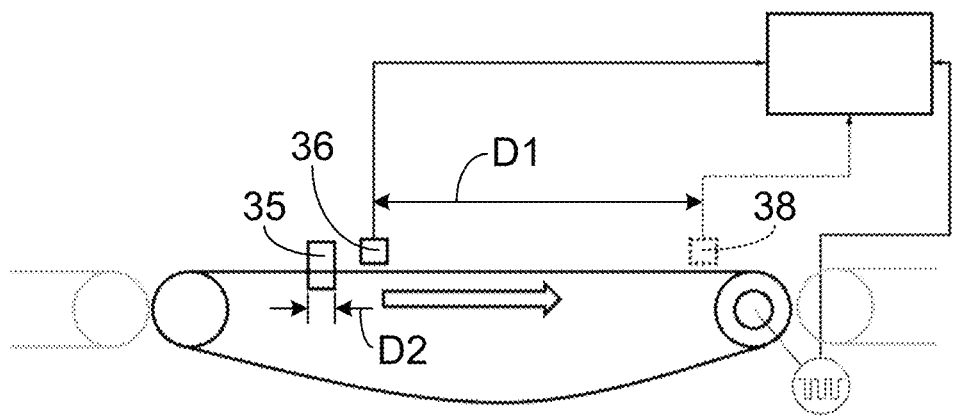
FIG. 4 is a schematic of a third version of a belt-stretch measuring system.

FIG. 4 depicts two alternative belt-stretch measuring systems that are analogous to the system of FIG. 1 and the system of FIG. 3. The difference is that in the systems of FIGS. 1 and 3 the detectable is a conveyed package while a detectable 35 in FIG. 4 is an embedded or marked belt feature, such as a notch, a magnet, a piece of metal, or a contrasting color marker. Alternatively, the detectable could be an inherent belt feature, such as a metal hinge rod, the head of a hinge rod, or any detectable belt feature. The position sensor used depends on the nature of the detectable. For example, a Hall-effect sensor could be used to detect a magnetic marker, or an optical device could be used to detect color changes or notches in the belt. The system could use two position sensors: an upstream sensor 36 separated a known distance D1 from a downstream sensor 38 and operate like the system of FIG. 1. Or the system of FIG. 4 could use just one sensor, such as the upstream sensor 36, and the predetermined length D2 of the detectable 35 as in the system of FIG. 3.

Figure 5:
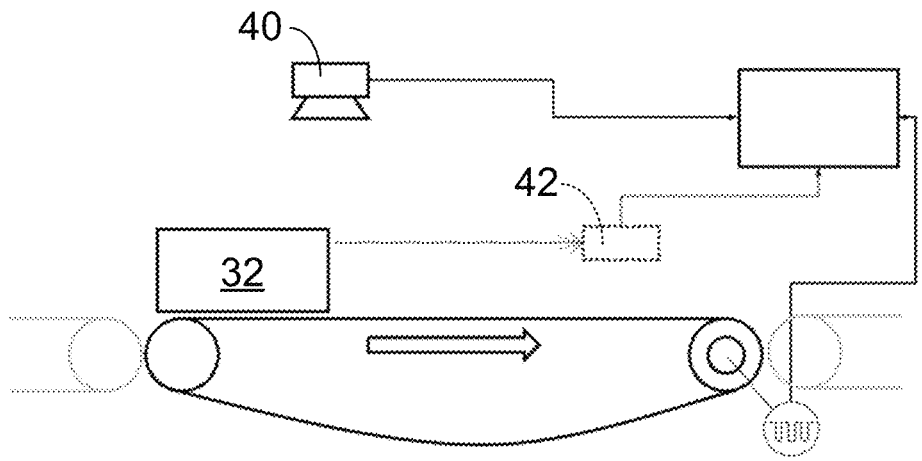
FIG. 5 is a schematic of a fourth version of a belt-stretch measuring system.
Figure 6:
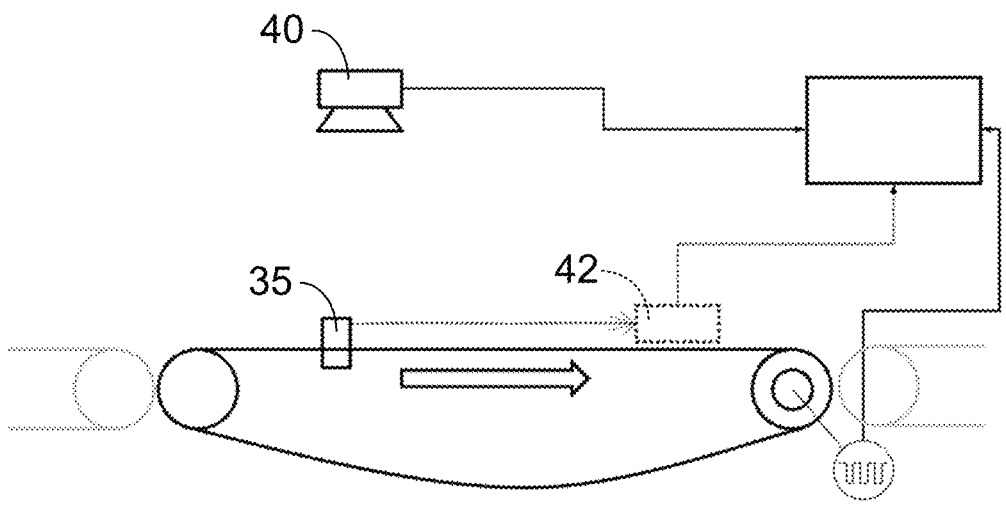
FIG. 6 is a schematic of a fifth version of a belt-stretch measuring system.

In FIG. 5 the position sensors of FIGS. 1 and 3 are shown replaced by an optical sensor 40 such as a 2D or 3D camera, a lidar device, or an optical sensor array. Like the previously described systems, the system of FIG. 5 can use package travel or package length measured by the optical sensor 40 to calculate belt stretch, belt pitch, and catenary sag. Alternatively, a distance sensor 42 such as a rangefinder, could be used instead. The distance sensor 42 can be used to detect the travel distance of a package 32 conveyed on the belt over a long distance. The system of FIG. 6 is the same, except that the detectable is an inherent or added belt feature 35.

Figure 7:
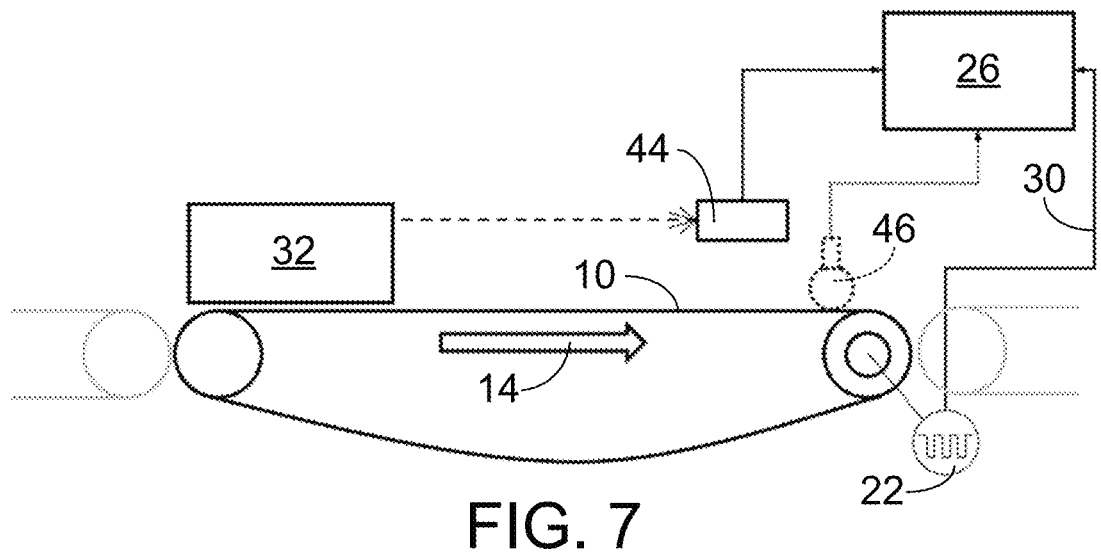
FIG. 7 is a schematic of a sixth version of a belt-stretch measuring system.

Instead of measuring belt travel distances as in FIGS. 1-6, the belt-stretch measuring system of FIG. 7 measures belt speeds in the direction of belt travel 14 with speed measurement devices. In one version the speed measurement device is a laser gun 44 aimed at the package 32. The laser gun 44 measures the actual belt speed. In another version a contact speed sensor 46 rolling on the top surface of the conveyor belt 10 on the carryway measures the actual belt speed. The actual speed is sent to the processor 26. The processor 26 determines the expected speed from the sprocket rotation and the number of sprocket teeth. The frequency of the pulses in the encoder signal 30 from the encoder 22 is proportional to the rotational speed of the sprocket 16. The processor 26 determines that frequency to calculate the expected belt speed. The processor calculates the belt stretch S as $S=(V_A/V_E)-1$, where $V_A$ is the actual belt speed measured by the speed measurement device 44, 46 and $V_E$ is the expected speed calculated from the encoder frequency and the number of sprocket teeth. The processor can use the actual belt speed in tracking packages. A handheld speed measurement device and a handheld sprocket rotation sensor, such as a handheld encoder, could be used instead of permanently mounted devices to determine the belt elongation of other belts in a facility.

Figure 8:
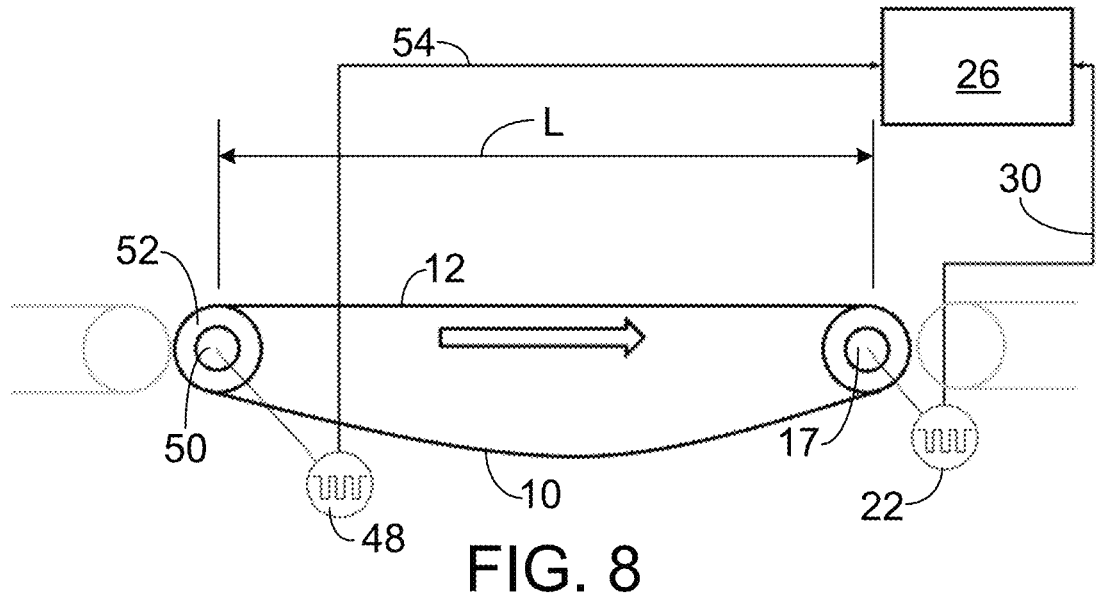
FIG. 8 is a schematic of a seventh version of a belt-stretch measuring system.

FIG. 8 shows yet another belt-stretch measuring system that uses two encoders: a drive-sprocket encoder 22 and an idle-sprocket encoder 48. The drive-sprocket encoder 22 is coupled to the drive shaft 17 or the drive sprocket 16 at the discharge end of the carryway 12. The idle-sprocket encoder 48 is coupled to an idle shaft 50 or idle sprockets 52 mounted on the idle shaft. Encoder signals 30, 54 are sent to the processor 26. The processor synchronizes the pulse trains produced by the two encoders 22, 48 when the new belt 10 is first run before it has stretched. As the belt stretches over time with wear, the encoder pulses in the encoder signal 54 from the upstream idle-shaft encoder 58 will increasingly lag the encoder pulses in the encoder signal 30 from the downstream drive-shaft encoder 16. The processor 26 accumulates the number of pulses by which the upstream encoder 48 trails the downstream encoder 22. The accumulated pulse differential count is saved in non-volatile memory, such as an EEPROM, so that the accumulated count is retained when the belt is shut off or a power outage occurs. The pulse spacing in the encoder signals 30, 54 represents a rotation of the shafts through a certain angle representing the resolution of the encoders. The accumulated pulses are a measure of the phase shift of the idle sprocket 52 relative to the drive sprocket 16. For example, if the encoders 22, 48 output 100 pulses per revolution, the pulses are spaced by 360°/100=3.6°. And if the accumulated pulse differential count is 5, the phase shift is 3.6°·5=18°. The processor 26 calculates the belt stretch as $S=(\phi \cdot T \cdot P_N)/(2\pi \cdot L)$, where $\phi$ is the phase shift between the sprockets in radians and L is the length of the carryway 12 between the two shafts 17, 50. The actual belt pitch $P_A = P_N \cdot (S+1)$ and the catenary sag are computed from the belt stretch value.

What is claimed is:

1. A method for measuring conveyor-belt stretch comprising:
   driving a conveyor belt having a nominal belt pitch in a direction of belt travel along a travel path with rotating sprockets having a predetermined number of sprocket teeth;
   mounting one or more sensors along the travel path;
   determining an actual belt speed or an actual travel distance of the conveyor belt from the detection of a detectable on the conveyor belt with the one or more sensors at a first time and at a later second time;
   determining a corresponding expected belt speed or a corresponding expected belt travel distance from an encoder signal from an encoder measuring the rotation of the sprockets and from the nominal belt pitch and the number of sprocket teeth, wherein the encoder signal is read to get a first encoder reading at the first time and a second encoder reading at the second time;
   determining the expected travel distance of the belt from the difference between the first and second encoder readings;
   calculating a belt stretch from the expected belt speed and the actual belt speed or from the expected belt travel distance and the actual travel distance.

2. The method as claimed in claim 1 wherein the belt stretch is calculated as the ratio less one of the actual travel distance to the expected travel distance.

3. The method as claimed in claim 1 wherein the belt stretch is calculated as the ratio less one of the actual belt speed to the expected belt speed.

4. The method as claimed in claim 1 comprising:
   mounting first and second position sensors of the one or more sensors along the travel path at a predetermined separation distance;
   reading the encoder signal to get a first encoder reading when the first position sensor detects the detectable and to get a second encoder reading when the second position sensor detects the detectable.

5. The method as claimed in claim 1 wherein the actual travel distance of the conveyor belt is a predetermined length of the detectable between a leading edge and a trailing edge.

6. The method as claimed in claim 5 comprising:
   reading the encoder signal to get a first encoder reading when a single one of the one or more sensors detects the leading edge of the detectable and to get a second encoder reading when the single one of the one or more sensors detects the trailing edge of the detectable.

7. The method as claimed in claim 1 wherein the detectable is an object conveyed atop the conveyor belt.

8. The method as claimed in claim 1 wherein the detectable is embedded in or marked on the conveyor belt or is an inherent feature of the conveyor belt.

9. The method as claimed in claim 1 comprising determining the actual belt speed with a speed measurement device and determining the expected belt speed from the frequency of pulses in the encoder signal.

10. The method as claimed in claim 1 comprising calculating the actual belt pitch as the product of the nominal belt pitch and the belt stretch plus one.

11. The method as claimed in claim 1 comprising calculating the sag in the conveyor belt in a belt return from the belt elongation, the length of the conveyor belt, and the geometrical arrangement of return rollers in the return.

12. The method as claimed in claim 1 comprising compensating the expected belt speed for the belt stretch to get a compensated belt speed and tracking packages using the compensated belt speed.

13. A method for measuring conveyor-belt stretch comprising:
   driving a conveyor belt having a nominal belt pitch in a direction of belt travel along a carryway with rotating first and second sprockets spaced apart a predetermined carryway length at opposite first and second ends of the carryway, wherein the first and second sprockets have a predetermined number of sprocket teeth;
   coupling first and second encoders to the first and second sprockets to produce first and second encoder signals measuring the rotation of the first and second sprockets;
   synchronizing the first and second encoder signals when the conveyor belt is operating at its nominal belt pitch;
   determining the phase shift of the second encoder signal relative to the first encoder signal;
   calculating belt stretch from the phase shift, the nominal belt pitch, and the number of sprocket teeth.

14. The method as claimed in claim 13 comprising belt stretch S as $S=(\phi \cdot T \cdot P_N)/(2\pi \cdot L)$, where $\phi$ is the phase shift between the first and second sprockets in radians, L is the predetermined carryway length, T is the predetermined number of sprocket teeth, and $P_N$ is the nominal belt pitch.

15. A conveyor-belt stretch measuring system comprising:
   a conveyor belt having a nominal belt pitch advancing along a carryway in a direction of belt travel and engaged with rotating sprockets having a predetermined number of sprocket teeth;
   one or more sensors along the carryway detecting the motion or position of a detectable on the conveyor belt and producing sensor signals at a first time and at a later second time indicative of the motion or position of the detectable;
   an encoder coupled to one of the sprockets and producing encoder signals measuring the rotation of the sprockets at the first time and at the later second time;
   a processor executing programmed instructions to:
     receive the sensor signals and the encoder signals;
     calculate an actual belt speed or an actual travel distance of the conveyor belt from the sensor signals;
     calculate a corresponding expected belt speed or a corresponding expected belt travel distance from the encoder signals and from the nominal belt pitch and the number of sprocket teeth; and calculate a belt stretch of the conveyor belt from the expected belt speed and the actual belt speed or from the expected belt travel distance and the actual travel distance.

16. The system as claimed in claim 15 wherein the belt stretch is calculated as the ratio less one of the actual travel distance to the expected travel distance.

17. The system as claimed in claim 15 wherein the belt stretch is calculated as the ratio less one of the actual belt speed to the expected belt speed.

18. The system as claimed in claim 15 wherein the one or more sensors are selected from the group consisting of video cameras, rangefinders, optical sensor arrays, and lidar cameras.

19. The system as claimed in claim 15 wherein the one or more sensors comprise a speed measurement device and the speed measurement device and the encoder are portable devices.

20. A method for measuring conveyor-belt stretch comprising:
    driving a conveyor belt having a nominal belt pitch in a direction of belt travel along a travel path with rotating sprockets having a predetermined number of sprocket teeth;
    determining an actual belt speed $V_A$ with a speed measurement device in rolling contact with the conveyor belt along the travel path or by measuring the speed of a detectable conveyed atop the conveyor belt along the travel path;
    determining a corresponding expected belt speed $V_E$ from an encoder signal from an encoder measuring the rotation of the sprockets and from the nominal belt pitch and the number of sprocket teeth;
    calculating a belt stretch S as $S=(V_A/V_E)-1$.

* * * * *